United States Patent Office 3,171,503
Patented Mar. 2, 1965

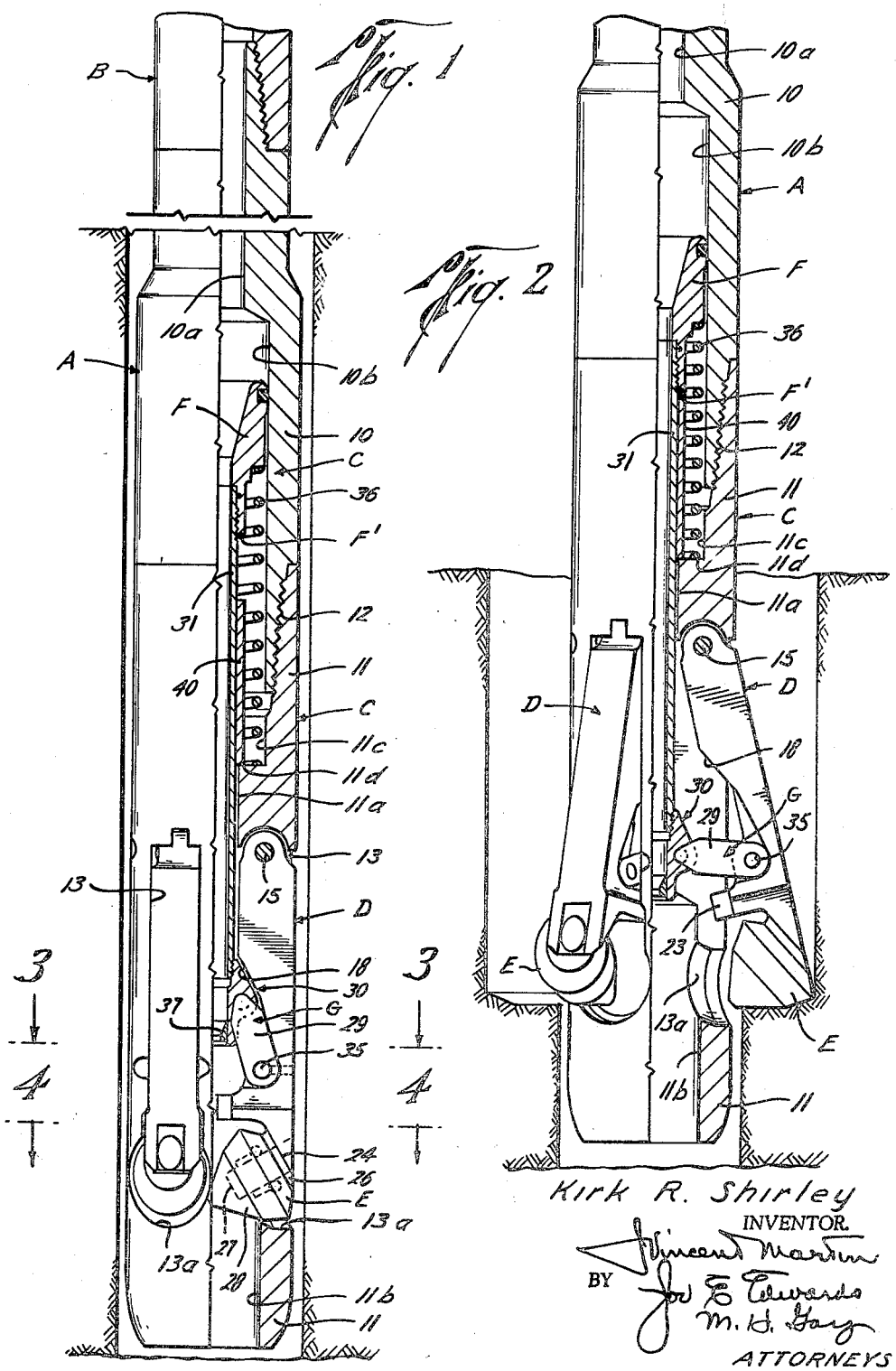

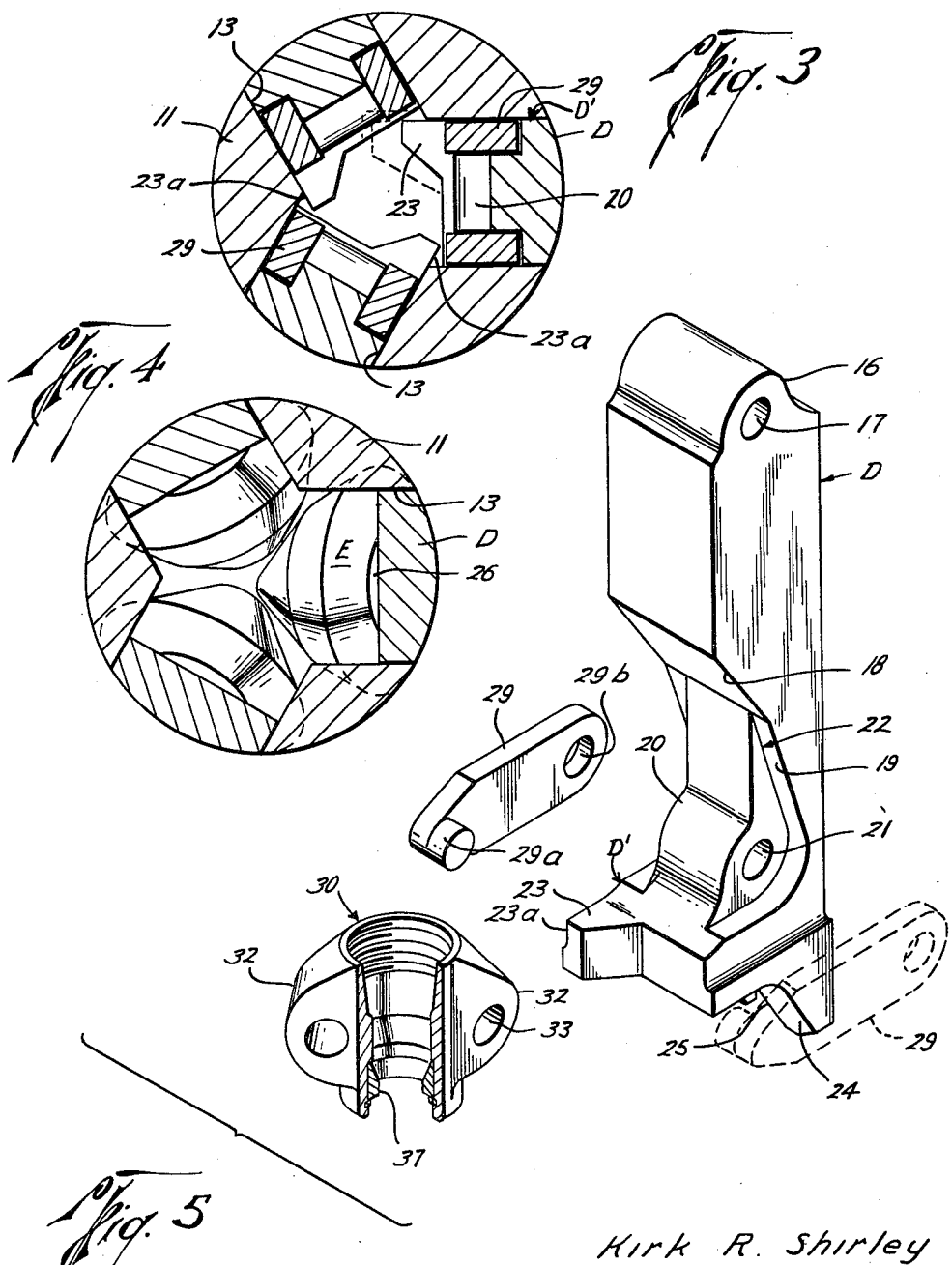

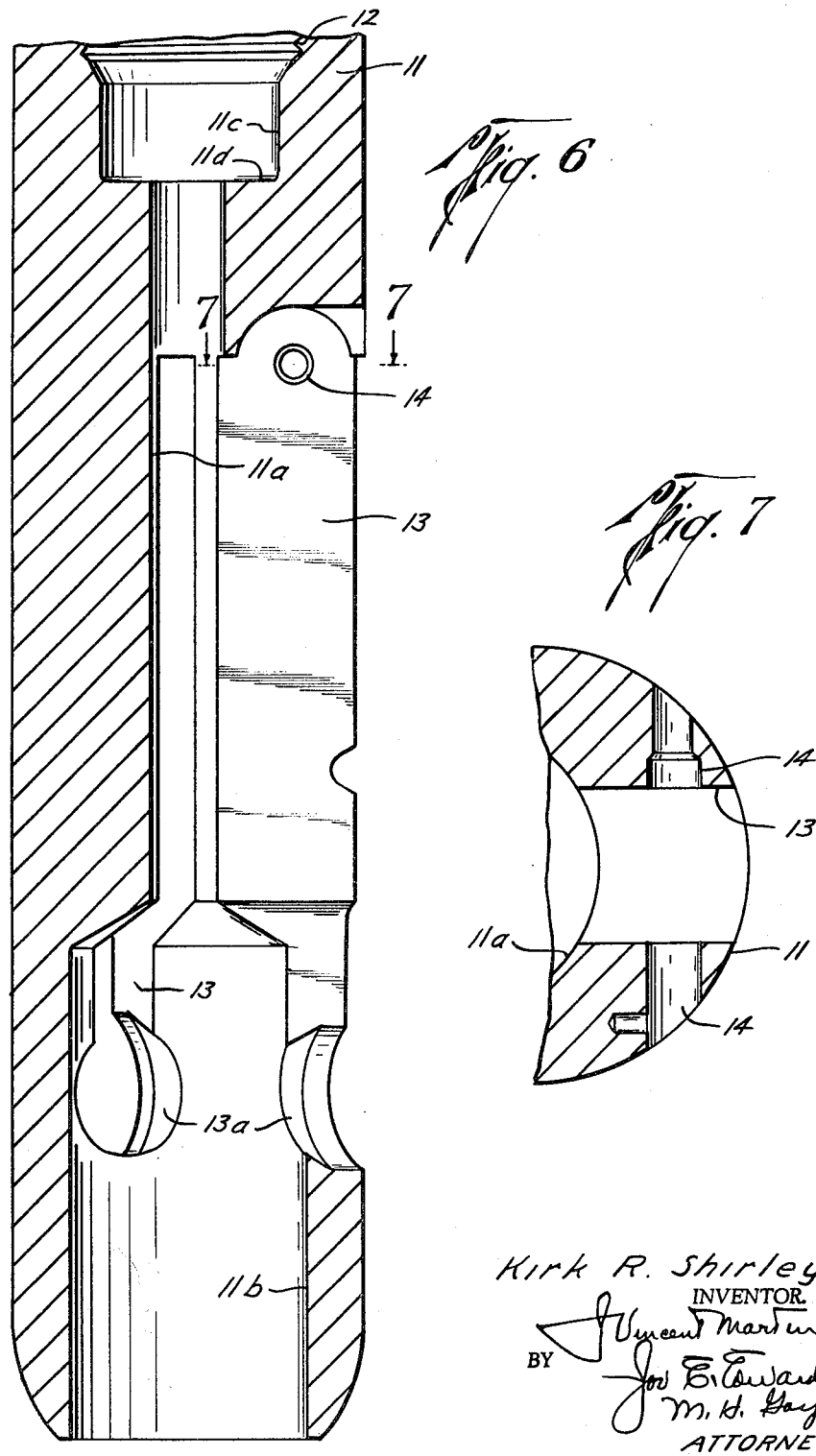

3,171,503
EXPANSIBLE ROTARY DRILL BIT
Kirk R. Shirley, 1539 Harbor Ave., Long Beach, Calif.
Filed May 2, 1962, Ser. No. 191,885
11 Claims. (Cl. 175—269)

This invention relates to new and useful improvements in expansible rotary drill bits, and more particularly to rotary drill bits or underreamers of the expansible type adapted to be lowered through a well casing or bore to drill or enlarge the well bore at the lower end thereof.

Rotary drill bits or underreamers of the expansible type have been in general use, and one example thereof is illustrated in the prior patent to Kammerer No. 2,941,785. The device includes a plurality of cutters disposed initially in retracted position and adapted to be expanded outwardly to enlarge a previously drilled hole; the expansion or outward movement of the cutters may be accomplished by a fluid pressure actuated piston provided with cam surfaces coacting with cam surfaces on the cutter-carrying elements. By reason of the coaction of the cam surfaces, movement of the pressure actuated piston effects an outward swinging of the cutters to move them into cutting position outside of the confines of the main body portion of the tool.

In the prior expansible rotary drill bits and underreamers which employ the cam surface structure to effect expansion, the maximum diameter of bore which may be drilled is limited by the particular shape of the cam surfaces and by the length of stroke or movement of the piston. If the tool is to be employed for drilling a larger diameter bore, it has been necessary to replace the cutter-carrying arms with arms having a different cam surface so that each time that the tool is to be used for enlarging a well bore to different diameters it has been necessary to change all of the cutter-carrying arms which are usually three in number.

The requirement of replacement of all cutter arms to increase the diameter of the bore which the tool will drill leads to the necessity of carrying a large inventory of different size cutter arms, and this involves considerable expense. For example, if a tool is provided with cutter arms to enlarge a bore to a 7½" diameter, it has a certain cutter arm provided with the required cam surface which, upon movement of the actuating piston, will move the cutters to the full 7½" diameter. When this same tool is to be employed for drilling a larger diameter hole, it is necessary to replace all cutter arms with ones having different cam surfaces which are so shaped that upon actuation of the piston the cutters are moved to a larger diameter, for example 12". It is thus apparent that the present type of expansible rotary bits or underreamers now in general use have made no provision for changing the maximum diameter of bore which may be drilled unless all of the cutter-carrying elements are changed which, as above pointed out, involves considerable cost primarily because of the large inventory of cutter-carrying elements or arms which must be maintained.

It is, therefore, one object of this invention to provide an expansible rotary drill bit or underreamer which is so constructed that a link connection is provided between the actuating piston and the cutter-carrying element or arm whereby it is only necessary to change the connecting links in order to control the maximum position to which the cutters may be expanded. This eliminates the necessity of replacing the relatively expensive cutter-carrying element or arm and makes it possible to adapt the tool to cutting bores of various sizes over a wide range with a minimum expense.

An important object of the invention is to provide an expansible type drill bit or underreamer wherein replaceable links are employed for connection between the actuating piston and the cutter-carrying elements, together with a replaceable stop means which coacts with the actuating piston, whereby the total stroke or movement of the piston may be accurately controlled in relationship to the particular size of connecting links which are employed, to thereby give an accurate control of the maximum diameter to which the cutters may be expanded.

Still another object is to provide a tool, of the character described, having an improved structure of cutter-carrying element which imparts the necessary strength to said element and which assures that the cutter arm may be swung to a maximum diameter while still maintaining the proper rotary connection between the body of the tool and each cutter-carrying element.

A particular object of the invention is to provide an inwardly extending projection on the cutter-carrying element or arm, which projection functions as a drive lug when the arm is swung to the outermost limit, said projection being formed to provide an amplified driving surface and being so located as to permit an inward retraction of all cutter-carrying arms to their fully retracted position during lowering of the tool into the well bore.

The construction designed to carry out the invention will be hereinafter described, together with other features thereof.

The invention will be more readily understood from a reading of the following specification and by refeernce to the accompanying drawings forming a part thereof, wherein an example of the invention is shown, and wherein:

FIGURE 1 is a view partly in section and partly in elevation and showing the cutter which is illustrated in cross-section in a retracted position;

FIGURE 2 is a similar view illustrating the cutter in its expanded position;

FIGURE 3 is a horizontal sectional view taken on the line 3—3 of FIGURE 1;

FIGURE 4 is a horizontal sectional view taken on the line 4—4 of FIGURE 1;

FIGURE 5 is an isometric exploded view of each cutter-carrying element or arm, the connecting links and the lower portion of the actuator piston;

FIGURE 6 is a vertical sectional view of the body portion of the tool and illustrating in full cross-section one of the slots in which the cutter-carrying element is mounted; and, FIGURE 7 is a horizontal cross-sectional view taken on the line 7—7 of FIGURE 6.

In the drawings, the letter A designates the expansible rotary drill bit or underreamer tool comprising the present invention and the upper end of said tool is adapted to be secured to the lower end of a string of drill pipe B extending to the top of a well bore, by means of which said tool is ordinarily lowered through a string of well casing (not shown) to an area below said casing where the hole enlarging operation is to be carried out. In general, the tool comprises a main body portion C within which are provided cutter carrying elements D having cutters E at their lower ends. An actuating piston F is movable within the bore of the main body portion C and has connection with links G which connect said piston to the cutter carrying elements or arms D. When the piston F is moved downwardly, the lower ends of the links G are swung outwardly and being connected to the lower portions of the cutter carrying arms D, said arms are swung outwardly to move the cutters E outwardly into an expanded position as shown in FIGURE 2. In such position, a rotation of the drill string rotates the main body portion C and the cutter carrying elements, whereby the cutters E will enlarge or drill out the well bore. When the piston returns to its upper position as shown in FIGURE 1, the links G connected therewith function to retract the cutter elements.

The body portion C comprises an upper tubular section 10 having its upper end connected to the drill pipe B and a lower housing 11 which is connected to the upper section by the threads 12. The upper section 10 has a bore 10a which communicates with the bore of the drill pipe and a counterbore 10b within which the piston F is slideable. The housing 11 has an axial bore 11a extending entirely therethrough and the lower end 11b of said bore is enlarged as clearly illustrated in FIGURES 1 and 2. The upper portion of the bore 11a has a counterbore 11c which is substantially the same diameter as counterbore 10b in the upper section.

A plurality of vertically extending slots 13 are formed within the body for the reception of the cutter carrying elements or arms D and as shown, three such slots are provided, although the number may vary. Each slot 13 extends longitudinally of the housing 11, and openings 14 for the reception of the ends of a pivot pin 15, which pivots a cutter element within the slot, are drilled in the side walls of each slot. The lower end of each slot terminates in a circular opening 13a through which the cone cutter E, mounted on the lower end of each cutter carrying arm D, may move.

The construction of each cutter carrying element or arm D is clearly illustrated in FIGURE 5 and said arm is substantially rectangular in cross-section, being provided with an ear 16 having a transverse opening 17 therein. The width of each arm is substantially the same as the width of the slot 13 and when the arm D is in position within the slot, the pivot pin 15 extends through the opening 17 with its ends engaged in the openings 14 of the housing 11, whereby each arm is pivotally mounted within each slot. The inner face of each cutter arm is formed in the manner shown in FIGURE 5 having an inclined surface 18 merging with a second inclined surface 19. A boss 20 having a transverse opening 21 therein is preferably formed integral with the arm and has a width less than the width of the surface 19 so that a connecting link receiving area 22 is provided on each side of the boss. Below the boss 20 and disposed at one side of the cutter arm D is an inwardly projecting drive lug 23. The outer surface 23a of the drive lug is a continuation of the outer side surface D' of the connecting arm. The surfaces D' and 23a are in substantial contact with one side wall of the slot 13, whereby when the arm D is in position within the slot and rotation is imparted to the housing 11, such rotation is transmitted to the cutter arm by reason of the housing contacting these surfaces.

Below the drive lug 23, the lower portion of the cutter arm is beveled outwardly to provide beveled surfaces 24 and in the central portion of this lower end a slot 25 is formed. The slot and beveled surfaces 24 are provided to receive the cutter assembly E which is a standard cone type bit. The cutter assembly includes a plate 26 which fits within the slot 25 and is welded therein. A cutter shaft 27 projects outwardly from the plate 26 and has the cutter 28 suitably secured on said shaft through the usual bearing arrangement (not shown). It will be evident that with each cutter arm pivoted within its respective slot, the cutters may be moved inwardly as shown in FIGURES 1 and 4 to a fully retracted position. By reason of the pivot pin 15 at the upper end of each arm, the arms may be swung outwardly beyond the confines of the outer surface of the housing 11 so that the cutters 28 will be expanded as shown in FIGURE 2.

For effecting a simultaneous expansion of the cutter arms D, each cutter arm has connection through a pair of links 29 with a connecting element 30 (FIGURE 5), which element is directly connected through a tubular sleeve 31 with the lower end of the annular piston F. The connecting element 30 has a plurality of outwardly projecting lugs 32, each having an opening or recess 33 therein. The upper ends of the links 29 are disposed one on each side of one of the lugs 32 and each has an inwardly projecting lug 29a which engages within the opening or recesses 33 of the lug 32 to pivotally connect the upper ends of said links to said lug. The lugs 29 are disposed one on each side of the boss 20 which is formed in the inner face of each arm D and openings 29b in the lower ends of the links align with the opening 21 in the boss 20 to receive a pivot pin 35 (FIGURE 1).

When the annular piston F is in its raised position to which it is urged by a coil spring 36, the connecting element 30 is also raised to be in close proximity to the inclined surface 18 of each cutter arm D. By reason of the connection with the links 29, the links are swung to the position shown in FIGURE 1 which causes their lower ends to move inwardly and maintain each arm retracted within the housing. An orifice ring 37 is mounted within the lower portion of the bore of the connecting element 30 (FIGURES 1 and 5) and when pressure fluid is pumped downwardly through the drill stem and through the annular piston F as well as the connecting sleeve 31, the orifice ring creates a restriction which will cause a pressure buildup above piston F. When this increased pressure overcomes the force of the coil spring 36, the piston F, sleeve 31 and connecting element 30 move downwardly with respect to the housing and to the cutter arms. This moves the upper pivot point between the conecting links and element 30 downwardly which results in an outward swinging movement of the lower ends of the link 29; such outward swinging movement causes the cutter arms D to pivot about the upper pin 15 whereby the lower ends of the arms are swung outwardly to move the cutters E to an expanded position. In order to control the radial expansion of the cutter arms, the downward movement of the annular piston F is limited by a stop sleeve 40 which surrounds the connecting sleeve 31 and rests upon an annular shoulder 11d formed between the bore 11a and the counterbore 11c of the housing 11. When the lower end F' of the piston engages the upper end of the stop sleeve 40, further downward movement of the piston is prevented to thereby limit the extent to which the lower end of links 29 are swung.

After the cutter arms have expanded to locate the cutters E radially outwardly of the housing 11, a rotation is imparted to the drill string B and is transmitted to the housing. By reason of the contact between the side wall of each slot with the side surface D' of each cutter arm and the outer surface 23a of each driving lug, this rotation is imparted to the arms to perform a drilling or underreaming operation. By providing the inwardly extending drive lugs 23, the effective side of each cutter arm which is contacted by the side wall of its respective slot is extended so that the range to which the cutter arm may be swung without losing the driving connection between housing and cutter arms is greatly increased. The driving lugs are positioned at one side of the inner surface of each cutter arm so that they will not interfere with full retraction of the cutter arms, said interfitting position of the lugs in fully retracted position being illustrated in FIGURE 3.

Assuming that the tool is to enlarge a bore to a full 7-inch diameter, a particular length of the connecting links 29 between each cutter arm and the connecting element 30 of the piston assembly is selected and also a particular length stop sleeve 40 is positioned around the connecting sleeve 31 of said piston assembly. In this way, the length of the piston stroke is controlled and the length of the links is controlled whereby when the piston reaches the lower limit of its movement, the cutters are properly positioned to drill a bore of the preselected diameter.

If it is desired to employ the tool to drill a bore of larger size, it is only necessary to replace the links 29 with ones having a greater length and to replace the stop sleeve 40 with a sleeve of shorter length. In such case, the length of the piston stroke would be increased and since the links 29 are of greater length, operation of the piston would cause the cutters E to move a greater distance radially outward from the housing. It will be evident that the provision of the inwardly extending drive lugs 23 assures that proper driving contact between the housing and the cutter arms is maintained under the maximum diameter drilling conditions; if the drive lugs were not provided, the thickness of each cutter arm would limit the amount which the cutter arm could swing because if the entire side area of the arm is outside of the slot, the amplified driving connection which imparts rotation from the housing to the cutter arm would be lost.

From the foregoing, it will be seen that a tool is provided in which one set of cutter arms and cutters may be employed for drilling the hole of varying diameters over a very wide range. In changing the tool to adapt it for drilling from one side hole to another, it is only necessary to interchange or substitute different length connecting links 29 and a different length stop sleeve. With these simple changes of parts which are relatively inexpensive, the tool is made adaptable for performing a drilling or underreaming operation to enlarge a bore to any desired diameter. It is only necessary to carry in inventory the different length links and the different length stop sleeves instead of having to carry an inventory of a great number of different size cutter arms. The cutter arms are considerably more expensive than the simple links and stop sleeves and with the arrangement shown, one basic tool may be employed for all size bores. By controlling the length of the connecting links in relationship to a control of the length of stroke of the piston, the outermost position of the cutters E may be accurately controlled. The construction permits the cutter arms to be made sufficiently heavy and rigid to withstand the drilling or underreaming operation and the provision of the connecting links assures positive outward motion of the cutter arms upon actuation of the piston. Although two connecting links have been illustrated as pivotally securing each arm to the connecting element 31, it is evident that the purposes could be accomplished by a single heavier link which would, of course, interfit with a slot or groove provided in the boss 20. As has been noted, the design and location of the drive lug 23 on each arm is such that when the cutter arms are in fully retracted position, an interfitting of these lugs occurs so that there is no interference with accomplishing a full retraction of said cutter arms.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. An expansible rotary bit for operation upon the formations in well bores to enlarge the well bores, including
    a body having a bore extending entirely therethrough and having a longitudinal slot in its wall,
    a cutter-supporting arm pivotally mounted at its upper end to said body within the slot of the body whereby the lower end of said arm may swing radially with respect to the body,
    a cutter carried by said arm,
    a pressure-actuated piston assembly movable longitudinally within the bore of the body within predetermined limits and having its lower end disposed adjacent said cutter-supporting arm,
    a connecting link member having one end pivotally connected to the lower end of the piston assembly and its opposite end pivotally connected to the cutter-supporting arm at a point on said arm between the cutter and the point at which said arm is pivotally mounted to said body,
    and a stop means removably mounted within the bore of the body and co-acting with the piston assembly to limit movement of said piston in a direction which will impart lateral movement to the cutter-supporting arm,
    said stop means being related to the length of said connecting link member whereby the radially outward extent of the movement of said cutter is controlled and whereby movement of said piston assembly and its connecting element relative to the body and cutter supporting arm imparts lateral movement to said arm and to the cutter carried thereby.

2. An expansible rotary bit as set forth in claim 1 wherein,
    the cutter-supporting arm has an inwardly directed drive lug formed on its lower end, the outer surface of which is an extension of the side wall of said arm, the side surface of said arm and the surface of said lug co-acting with one side wall of the slot in the body to provide for a rotary connection between the body and the arm.

3. An expansible rotary bit for operation upon the formations in well bores to enlarge the well bores, including,
    a body having a bore extending entirely therethrough with an enlarged counterbore at its upper end, said body having a plurality of longitudinal slots in its wall which are spaced circumferentially around the body,
    a cutter-supporting arm pivotally mounted in each of said slots for lateral movement with respect to the body,
    a cutter carried by each arm,
    a piston assembly including a piston which is movable within the counterbore of the body and which also includes a tubular extension extending downwardly therefrom to a point below the point at which said arm is pivotally mounted in said slot, said extension being movable within the bore of the body,
    and a connecting link member for each cutter-supporting arm, each link member having one end pivotally connected to the periphery of the lower end of the tubular extension of the piston assembly at a point below the point at which said arm is pivotally mounted in said slot and its opposite end pivotally connected to its respective cutter-supporting arm, whereby a downward movement of the piston and its extension relative to the body and cutter-supporting arm imparts lateral movement to all of said cutter arms and the cutters carried thereby.

4. An expansible rotary bit as set forth in claim 3 together with
    a coil spring acting upon the piston assembly to urge said piston assembly in an upward direction relative to the body to thereby urge the cutter-supporting arms and cutters toward a retracted position.

5. An expansible rotary bit as set forth in claim 3 together with
    a stop sleeve surrounding the piston extension and supported within the body, the spacing between the upper end of said sleeve and said piston determining the amount of movement of the piston relative to the body in a direction which will impart lateral outward movement to the cutter-supporting arms, the length of said stop sleeve being related to the length of each of said connecting link members whereby the radially outward extent of the movement of each of said cutters is controlled.

6. An expansible rotary bit apparatus for enlarging the size of a well bore including,
    a body having an axial bore extending entirely therethrough,
    a cutter-supporting arm element,
    means pivotally mounting said arm element on said body to effect an outward radial movement of the lower portion of said arm with respect to the body, a cutter carried by the lower portion of said arm element, a piston assembly slidably mounted for longitudinal movement within the bore of the body and having its lower portion projecting into a plane opposite the arm element, said piston assembly having means for imparting downward movement to the assembly relative to the body and to said arm element upon application of fluid pressure thereto, a connecting link member having one end pivotally connected to the lower portion of the piston assembly and its opposite end connected to the cutter-supporting arm element, whereby downward movement of said piston assembly relative to the body and arm element imparts a radially outward movement to the lower portion of the arm element and the cutter carried thereby, a stop means mounted in the body and positioned to coact with the piston assembly to limit downward movement thereof with respect to the body and cutter element, the position of said stop means with respect to the piston element being related to the length of the connecting link member, whereby the permissible downward travel of said piston assembly and the length of said connecting link member control the distance which the cutter-supporting arm element and its cutter move radially outward, and means for removably mounting said stop means within said body.

7. An expansible rotary bit apparatus as set forth in claim 6 wherein said stop means is a tubular sleeve disposed within the bore of the body and encircling the upper portion of the piston assembly, said piston assembly having an external projection normally spaced above the upper end of said sleeve and engageable therewith to stop downward movement of the piston assembly relative to said body.

8. An expansible rotary bit for operation upon the formations in well bores to enlarge the well bores including, a body having an axial bore extending entirely therethrough and having a plurality of longitudinal slots in the lower portion of its wall which slots are spaced circumferentially around the body, a plurality of cutter-supporting arms pivotally mounted on said body, each arm being movable through one of the slots in a generally radial direction with respect to the body, a cutter carried by the lower portion of each arm, a piston assembly mounted within the bore of the body and movable longitudinally therein within limits with respect to the body and to the cutter-supporting arms, a connecting link member for each cutter-supporting arm having one end pivotally connected to said arm and its opposite end pivotally connected to the piston assembly, whereby movement of said piston assembly downwardly relative to the body and cutter-supporting arms imparts generally radial outward movement to said arms and the cutters carried thereby, each arm having one surface thereof in contact with one wall of the slot in which it is movable to provide a rotative connection between the body and each arm, and a drive lug on the inner side of each arm forming an extension of that surface of the arm which engages the wall of its respective slot, said lug also engaging the wall of the slot to provide rotative connection between the body and arm when the arm is at its outermost radial position relative to the body.

9. An expansible rotary bit as set forth in claim 8 together with, stop means removably mounted within the body and engageable by the piston assembly to limit the downward movement of said assembly and thereby control the outward radial movement of the cutter-supporting arms and the cutters carried thereby.

10. As a subcombination in an expansible rotary bit, a cutter-supporting arm comprising an elongate arm element which is substantially rectangular in cross-section, the inner surface of said element being recessed intermediate its ends with a central boss formed within said recess, a drive lug projecting inwardly from the inner surface of the element below the recessed portion with the outer surface of said drive lug being co-extensive with the side surface of the lower end of said element, means below said drive lug for mounting a cutter thereon and means at the upper end of said arm having a transverse opening therein for pivotally mounting said elongate arm element.

11. As a subcombination in an expansible rotary bit, an actuating member and cutter-supporting arm assembly including, a cutter arm comprising an elongate body portion having means for pivotally mounting the arm at its upper end and having means for supporting a cutter at its lower end, the inner surface of the body of said arm having a connecting boss, a link connectible with said boss, a movable actuating means including a connecting element having a projecting lug, means for pivotally connecting the link to the lug of said connecting element whereby movement of the actuating means and its connecting element in a vertical direction will effect a swinging movement of the lower end of the cutter-supporting arm, and a drive lug projecting inwardly from the inner surface of the cutter arm body and disposed at one side thereof whereby the outer surface of said lug forms a continuation of the side surface of the lower portion of said cutter arm.

References Cited in the file of this patent

UNITED STATES PATENTS

| | | |
|---|---|---|
| 1,921,135 | Santiago | Aug. 8, 1933 |
| 1,654,574 | Kammerer | Oct. 6, 1953 |
| 2,743,087 | Layne et al. | Apr. 24, 1956 |